Figure 1:
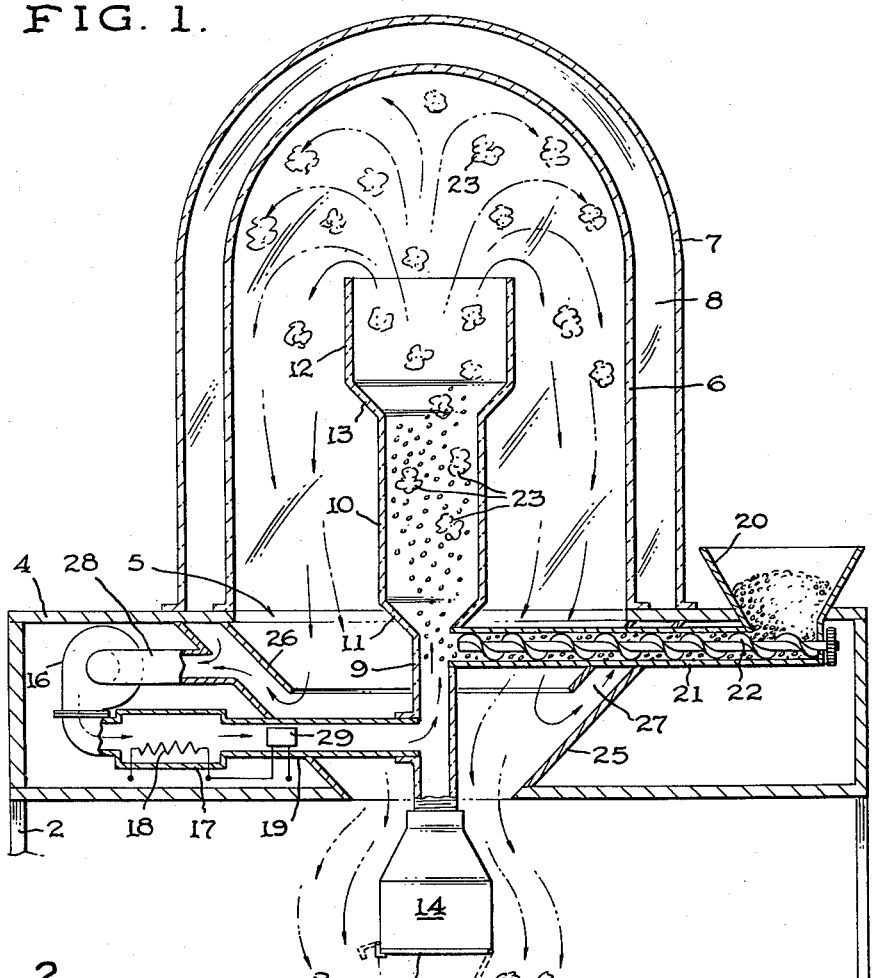

Jan. 26, 1960 J. GREEN 2,922,355
CORN POPPING APPARATUS
Filed Feb. 25, 1958

INVENTOR
JULIUS GREEN
BY Cameron, Kerkam & Sutton
ATTORNEYS

United States Patent Office 2,922,355
Patented Jan. 26, 1960

2,922,355

CORN POPPING APPARATUS

Julius Green, New City, N.Y., assignor to General Foods Corporation, White Plains, N.Y., a corporation of Delaware Application February 25, 1958, Serial No. 717,346

18 Claims. (Cl. 99—238.6)

This invention relates to an improved method and apparatus for popping corn which are especially adapted for use in public or semi-public locations such as stores, theaters, amusement parks and the like where corn is popped for retail distribution directly to the customer. This application is a continuation-in-part of my prior application Serial No. 481,135 filed January 11, 1955 now abandoned.

It has been proposed heretofore to heat raw popcorn kernels while they are suspended in a current of air or gas so that when the kernels pop, their greatly altered aerodynamic characteristics cause them to be separated from the suspended unpopped kernels and to be carried out of the popping zone. This principle is disclosed, for example, in Nelson Patent No. 2,602,134 wherein the kernels while suspended in an ascending air current are heated by high frequency electromagnetic or electrostatic fields. In this case, however, the ascending air current loses velocity gradually so that the individual kernels are moved upwardly to different levels depending on their size and density, and uneven heating and popping result; also the separation of popped kernels from unpopped kernels is not positive enough.

The present invention also makes use of currents of air or any other desired inert gas to carry the raw kernels to and to suspend them in a popping zone and to convey the popped kernels out of this zone, but utilizes for these purposes improved apparatus which eliminates the use of high frequency electrical apparatus. The invention also provides for the control of the air movement according to a new method which improves the separation of the popped kernels from the unpopped kernels and also decreases the proportion of unpopped kernels discarded as "old maids," and further provides a visible fountain-like display of popped kernels which is of great attractiveness and appeal to the prospective customer.

The invention may be embodied in portable apparatus designed for use on the floor or on the ground or on a store counter or like supporting surface, and it may be operated continuously to build up and store a supply of popped corn or intermittently as a demand for popped corn may arise. Depending upon circumstances, moreover, the popped kernels may be discharged from the apparatus for collection in external receptacles, or the apparatus itself may include a collecting chamber, preferably transparent, in which the popped corn is collected and stored until dispensed. In permanent installations such apparatus may be built in as an integral part of a counter or other piece of equipment. These and similar factors will determine the design and construction of the cabinet and supporting structure to be employed in each case, as will be readily apparent to those skilled in the art.

It is important in regulating and controlling the movement of the air or gas to make sure that it meets certain definite and distinct requirements. First, the raw or unpopped kernels are delivered into a first transporting zone in which the velocity of the air stream must be sufficient to insure the positive elevation of the kernels to a superposed heated popping zone. The air velocity necessary to accomplish this transportation is readily determinable according to the knowledge and experience of the art of pneumatic conveyors. The flotation velocity is a function of the diameter and specific gravity of the kernels and the transportation velocity ordinarily should be at least twice the flotation velocity. It can be provided, according to the general formula $Q=AV$, by regulation of a blower or other circulation device to supply a quantity of air Q, and by defining the moving body of air in a stream the area A of which bears such a relation to the quantity Q as to provide the desired velocity V. The raw kernels are conveyed into this moving current by any appropriate mechanical means.

It is very desirable that the aforesaid transporting velocity V be maintained up close to the entrance of the popping zone, not only to insure delivery of the raw kernels to the popping zone, but also to make sure that unpopped kernels are not blown back down and out of the zone as explained below. On the other hand, in order to insure that the kernels remain in the popping zone long enough to be heated and popped, the exit velocity $V_1$ from this zone preferably is somewhat less than the flotation velocity for the unpopped kernels. It will be evident that the popping explosion of a kernel may impart sudden upward or downward accelerations to neighboring individual unpopped kernels. To prevent such downwardly accelerated unpopped kernels from leaving the popping zone, the velocity V at the entrance to this zone must provide an upward thrust or pressure against the kernels which is great enough to resist and overcome such downward accelerations and therefore should be substantially greater than the flotation velocity to insure the results described above. To prevent upwardly accelerated kernels from leaving the zone, the exit velocity $V_1$ is less than the flotation velocity for a sufficient height that the upward acceleration is dissipated before the kernels pass out of the popping zone and accordingly they fall back into the heated zone.

The reduction in velocity from V to $V_1$ may be provided by independent control of the air circulation in the two zones, but preferably by slowing down the rapidly moving inlet air stream due to either one or both of two causes. The heat required for popping may be provided in any suitable manner, but where it is supplied by heating the inlet air, the cooling effect of the raw corn produces a substantial temperature drop by the time the air has moved into the popping zone, so that its velocity is decreased correspondingly. In addition the drop in velocity is accomplished by substantial enlargement of the cross section of the stream passing through the popping zone, the velocity being reduced thereby according to the general formula $Q=AV$.

It is desirable that the suspended bed or mass of kernels in the popping zone be maintained in a turbulent condition. This condition is secured by using the relatively small diameter, high velocity, inlet air stream somewhat like a jet, blowing it into or near the bottom of the popping zone and allowing it to lose velocity as it expands in eddies and whorls, thus maintaining the mass of suspended kernels in a state of turbulent agitation. This condition insures uniform heating and popping. If the popping zone is of sufficient height, however, there will be a fairly steady stream of air leaving the upper end of this zone at the exit velocity $V_1$ so as to minimize the risk of carryover of unpopped kernels as the result of the aforesaid turbulent agitation. This exit zone may also contain some unpopped kernels which have been "kicked" upwardly by the popping explosions of neighboring kernels, but the exit zone is made high enough to provide for the dissipation without carryover of upward accelerations.

When a kernel pops at any point in the popping zone, it suddenly acquires a size many times larger than the unpopped kernel and a correspondingly decreased density. The velocity $V_1$ is ample to displace these popped kernels out of the popping zone. If desired, the cross section of the stream may be further enlarged above the popping zone so that its velocity is still further reduced below $V_1$ as an added protection against carryover of unpopped kernels. In other cases, however, it may be desirable to get the popped kernels away from the heating zone rapidly to avoid overheating and possible parching or other undesirable effects. In this case it has been found satisfactory to rely on the popping zone itself to avoid carryover of unpopped kernels as already explained, and to constrict the cross section of the stream above the popping zone with the result of increasing the air velocity above $V_1$ and removing the popped kernels more quickly.

As an illustration, assuming ordinary popcorn kernels, the exit air velocity $V_1$ from the popping zone should not exceed about 1700 feet per minute nor be less than about 700 feet per minute; preferably it should be in the range of 1000–1300 feet per minute. The transporting velocity V in the inlet tube should be at least about 2000 feet per minute, and where allowance must be made for expansion due to heating the inlet air, as well as substantially restricted cross sectional area, the velocity V may be as high as 4000–5000 feet per minute.

The accompanying drawings illustrate two embodiments of the invention in the form of portable apparatus suitable for use on or as part of a store counter or the like and adapted to carry out the above process. It will be understood, however, that these drawings are for purposes of illustration only and are not to be construed as a definition of the limits of the invention, reference being had to the appended claims for this purpose.

Figure 2:
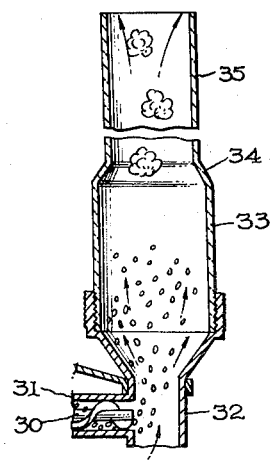

In the drawings,

Fig. 1 is a somewhat schematic view, partly in section, of apparatus embodying the invention; and Fig. 2 shows another form of popping unit which can be employed.

Referring to Fig. 1, the apparatus comprises a cabinet 1 of any suitable size, shape and material which is supported by legs 2 on a surface 3 which may be a store counter or the like. The top horizontal surface 4 of the cabinet 1 has an opening indicated generally at 5 in which the popping device is mounted as hereinafter described. The space above the opening 5 is enclosed by any suitable type of housing so as to confine the popped kernels, this housing preferably being transparent so that the fountain of popped kernels hereinafter described is visible to the prospective customer. Preferably, provision is also made for heat insulation and to this end the housing may suitably comprise a double wall of clear glass or plastic material, the enclosed space between the two walls being either filled with air or gas or vacuumized. In the form shown, this housing comprises two inverted glass vessels of the nature of bell jars having cylindrical walls and rounded or domed tops, the inner vessel 6 enclosing the popping space and the larger outer vessel 7 surrounding the vessel 6 to provide between them the insulating space 8. These two vessels may be mounted on and connected or sealed to the top 4 of the cabinet in any suitable manner.

In the form shown in Fig. 1, the popping device per se comprises a series of end-to-end tubular sections having successively larger diameters in the upward direction. The lowermost section 9 of smallest diameter is connected to the intermediate section 10 by a tapered wall 11, and said intermediate section 10 is connected to the top section 12 of greatest diameter by a tapered wall 13. The upper end of the popping device is open, but the lower end preferably is provided with a receptacle or trap 14 of defective kernels which do not pop or "old maids." The receptacle 14 may be removable and/or closed by a suitable door 15 so that the old maids may be removed at intervals.

A blower 16 of any suitable type, preferably electrically energized, blows through a heating chamber 17 containing a suitable heating element 18, preferably also electrical, and thence through a conduit 19 into the lower section 9 of the popping device, the air thence passing upwardly through the sections 9, 10 and 12 and out the open upper end of the device.

From the description of the process set forth above, it will be understood that the section 9 of this popping device is the inlet or transporting section in which the velocity V is maintained. The intermediate section 10 forms the popping zone, the exit velocity $V_1$ being maintained at the top of this section 10 where it joins the tapered wall 13. The upper and largest section 12 causes a further reduction of velocity below $V_1$ as described above, thus providing more positive separation of the popped and unpopped kernels.

As will be seen from the drawings, the cross sectional area of the section 10 is preferably much larger than that of the inlet section 9. This helps to slow down the inlet velocity V and also facilitates the maintenance of the bed of raw corn in turbulent agitation. This results from the fact that the gas stream from the inlet section blows into the lower part of the popping zone somewhat like a jet as explained above and has room to expand and eddy. Usually but not necessarily, it will be preferable to have this jet action near the center of the bottom of the popping zone, since this can be arranged so easily by merely setting the inlet zone and the popping zone end-to-end and approximately coaxial.

As will also be seen from the drawings, the connection of the successive sections of the popping device by means of the relatively short flaring or tapered connectors 11 and 13 eliminate "backwater" eddies that might form in the outer regions near the bottom of the intermediate section, in which kernels could settle and possibly be exposed overlong to the heated atmosphere in the popping zone. Any such kernels tend to move down the tapered surfaces and are caught up again by the ascending currents.

The raw kernels are introduced into the stream of air or gas passing through the inlet or transporting section 9 of the device. This introduction may be performed in any suitable manner; for example, the raw corn is placed in a feed hopper 20 which extends through the cabinet top 4 and is connected with a feed conduit 21 having therein a suitable feeding device such as a rotating screw 22. As the raw kernels are fed out of the end of the tube 21 and into the section 9, they are caught by the high velocity current of gas and carried upwardly into the popping zone 10. As already explained, the velocity in the section 9 is high to insure against any raw kernels dropping into the trap 14. The high velocity of the gas current across the open end of the feed tube 21 is also desirable as it tends to minimize the introduction of heat into the feed tube and even to cause a certain aspirating effect, thus practically eliminating premature popping of the kernels in the feed tube.

As further explained above and as shown in the drawing, the intermediate section 10 contains a floating mass or bed of suspended unpopped kernels in a state of turbulent agitation. These kernels absorb heat from the hot gas and from time to time they pop or explode at random points as indicated at 23. Immediately after this occurs, the size of the kernel is greatly increased and the popped kernel not only presents a much greater area to the rising current of gas but also occupies a considerably larger volume than before popping. Because of these factors, the kernels are carried out of the zone 10 immediately as they pop, and the exit velocity from the popping zone as well as the reduced velocity of the gas in the top section 12 is sufficient to carry these popped kernels out the open upper end of the popping device. On the other hand, the rather abrupt reduction of velocity due to the increase in cross sectional area provided by the tapered section 13 minimizes the danger that unpopped kernels may be carried out of the popping zone 10, especially when subjected to the impact of exploding adjacent grains or of popped grains moving out of the popping zone.

With the device in operation, therefore, a fountain of popped kernels issues from the open top of the popping device and is deflected radially outward by the domed top of the housing or vessel 6 and thence downwardly in a showerlike spray surrounding the popping device. This shower is in full view of the customer because of the transparency of the housing 6, 7 and provides a very attractive display which tends to excite the interest and curiosity of the customer.

In the form shown, the popped kernels are discharged from the apparatus and collected in an external receptacle which may be simply a conventional pan 24 or the like on the counter top 3. Preferably the discharge is concentrated and centered by the provision of a funnel-like wall 25 extending downwardly from the cabinet top 4 and converging toward the old maid receptacle 14, whereby the falling kernels are directed inwardly around the receptacle 14 and into the receptacle 24. It is also important, however, to provide for withdrawal of the hot air or gas in such a manner as to permit its recirculation for the purpose of conserving heat, and preferably the circulating air is withdrawn before it reaches the receptacle 24 so that the popped kernels are not blown into the receptacle with too great force and/or are not blown out of the receptacle and carried away. This air withdrawal can be accomplished readily by making a section of the wall of the funnel 25 pervious to air, as by screening, perforation, and the like, and by applying a suitable suction to this section. For example, a second funnel-like wall 26 of less diameter than the funnel 25 may be located coaxially within the wall 25 so as to provide an annular space 27 therebetween. The wall 26 is of less depth than the wall 25 and preferably terminates at a point approximately midway between the top and bottom walls of the cabinet. By connecting a suitable suction to the annular space 27, preferably the suction intake 28 of the blower 16, the space 27 provides for the withdrawal of the hot gas from the descending shower of popped kernels. The abrupt change of direction of the gases is resisted by the falling kernels so that they continue to fall freely through the funnel to the collection receptacle while the air is withdrawn for recirculation.

In order to insure that the air delivered to the popping device is of constant temperature during continued operation, a thermostat 29 is placed in the air stream at a point intermediate the heating element 18 and the popping zone 10, preferably within conduit 19. The thermostat 29 is, of course, connected with the heating element 18.

While the decrease of velocity of the gas current provided by the sections 12, 13 helps to insure that no unpopped kernels are carried out of the popping zone, acceptable results can also be obtained with a device in which these top sections are omitted and the intermediate section 10 is given a sufficient height as explained above in the description of the process. In such cases, moreover, it may be desirable to provide a top section situated above the intermediate section 10 and corresponding in position to section 12 of Fig. 1, but having a diameter smaller than the intermediate section 10 for the purpose set forth above. A popping device of this type is illustrated in Fig. 2. Suitable feeding means such as the screw 30 feed the raw kernels through the supply pipe 31 into the inlet or transporting zone 32 which corresponds to the zone 9 described above. The current of air or gas passing through this zone 32 carries the unpopped kernels into the intermediate popping zone 33 corresponding to the zone 10 described above and in which the unpopped kernels are suspended in a bed or mass in a state of turbulent agitation. The zone 33, of course, has sufficient height to prevent the escape of any unpopped kernels as already explained. The popped kernels are carried to the top of the intermediate section 33 by the exit velocity $V_1$, where a slight increase in air velocity caused by the tapered wall 34 and the constricted top section 35 effects rapid removal of the popped corn from the device. This device of Fig. 2 may be employed in place of the device 9—13 of Fig. 1, the hot gas being introduced into the section 32 by a conduit corresponding to conduit 19 of Fig. 1 and the hot gases being withdrawn and recirculated by the means shown in Fig. 1 or any other suitable means.

As mentioned above, the popping device is preferably constructed of substantially tubular material containing a plurality of end-to-end tubular sections. While a device having a circular cross section is preferred for reasons of convenience and efficiency, devices having square, rectangular, or elliptical cross sections may be employed if desired.

By way of example, the popping device 9—13 may comprise a popping zone 10 of say 2¼" diameter, an outlet zone 12 of say 2¾" diameter, and an inlet conduit 9 of somewhat less than 2" diameter, say 1 to 1½". With a device of this size, good results have been obtained when the inlet air delivered to the section 9 of the popping device is in the range of 440–475° F. Below 425° F. both the yield of popped kernels and the degree of expansion of the kernels are undesirably low, and above 475° F. the degree of expansion of the popped kernels again decreases undesirably. Preferably the temperature range in the example given should be about 445–455° F.

Under the above conditions there may be considerable variation in the air velocity through the popping device. Considering for example the exit velocity $V_1$ from the intermediate popping zone 10, which is most readily measurable, a velocity less than about 700 feet per minute is undesirable because of the danger that raw or unpopped kernels may fall back into the old maid receptacle 14 in spite of the much greater velocity V in the section 9; also at this low value there may be some occasional difficulty in ejecting the popped kernels from the popping device. On the other hand, at above approximately 1700 feet per minute in the popping zone, the raw kernels may be ejected therefrom before they have had time to pop. In the example given, the preferred range of operation is 1000–1300 feet per minute for the exit velocity $V_1$ at the top of the intermediate zone 10.

Under these preferred conditions of temperature and velocity, the air is recovered via the suction 28 at a temperature of about 325–350° F. and is reheated in the chamber 18 to the preferred inlet temperature of 445–455° F. before being recycled. The feed of the raw kernels is of course regulated so that it does not exceed the capacity of the device, but may obviously be decreased to any desired rate below such maximum without interfering with the operation of the device. It will be understood that there will be a gradual accumulation of old maids suspended in the popping zone 10 which will necessitate periodic shutdowns. By way of example, a device of the described size may be operated for 15 to 20 minutes. The raw corn feed is then stopped for a brief interval, say 1½ minutes to permit all poppable kernels in the zone 10 to pop, after which the blower 16 is stopped to permit any remaining unpopped kernels to drop into the receptacle 14. This requires only a very brief interval of less than a minute, after which the device is ready for restarting if desired. It will be understood, of course, that if desired these operations may be repeated cyclically by suitable mechanical or electrical control of the operation of the blower 16 and raw corn feeder 22.

It is realized that the conditions of temperature, air velocity, feed rate of raw corn, and the like under which the operation of this apparatus is described above may be varied to a considerable extent. For example, the temperature of the inlet air delivered to section 9 may be increased to 525° F., if, at the same time, the rate at which the unpopped corn is fed into the device is also substantially increased. Similarly, an increase in feed rate may require an increased air velocity in order to maintain the desired agitated bed of unpopped kernels within section 10. Accordingly, operating conditions may be modified as desired, to meet the needs of the particular apparatus and user, without parting from the spirit of this invention.

It will be apparent to those skilled in the art that in addition to the novel and attractive display of the popped corn, the invention has many advantages of substantial practical importance. For example, the apparatus can be operated continuously for extended periods of time with no attention other than manual or other control of the feeder 22 and blower 16 as described above. The device itself is extremely simple, its only moving parts being the screw feeder and the blower. Because of its closed hot air system and the elimination of oil, etc., there is no odor which is an important factor in the suitability of the device for use in a closed space such as a store.

On the other hand, the quality of the product produced by such a device is excellent both with respect to high volume expansion and low incidence of old maids. The product quality is consistently as good as that obtained with the "Official volume tester" of the National Association of Popcorn Manufacturers, as described for example in the article by W. A. Hulsen et al., entitled "Temperature of Popper in Relation to Volumetric Expansion of Popcorn," Food Technology, September 1954, page 394. Expansion ratios of 30× to 32× are typical of the operation of the device. These excellent results are believed to be due to the facts that the kernels in suspension are not subjected to pressure from adjacent kernels to interfere with their expansion and are heated rapidly and uniformly by the high velocity turbulent air stream. Also each individual kernel is immediately removed from the popping chamber as soon as it pops whereas in conventional poppers the batch is not dumped until completed with the resultant risk of scorching some of the popped kernels. Due to the improved popping conditions, moreover, the number of old maids is substantially reduced and the danger of finding one in the popped product is practically eliminated.

While only one embodiment of the invention has been illustrated and described with particularity, it will be understood by those skilled in the art that the invention is not restricted to this embodiment and that various changes may be made in the details of construction and arrangement of parts without departing from its spirit. Reference should therefore be had to the appended claims for a definition of the limits of the invention.

What is claimed is:

1. Corn popping apparatus comprising a housing, a popping device including an air duct disposed vertically within said housing and having an open upper end, means for blowing a current of gas into and upwardly through said device and out its upper end into said housing, means for feeding raw kernels into said device at a point near but down stream from said blowing means, said blowing means producing a gas velocity sufficient to suspend unpopped kernels in said device while carrying popped kernels out its open upper end, means for heating suspended kernels, said housing having means above said open upper end to deflect the gas and the popped kernels carried thereby radially outwardly from said upper end and then downwardly around said device, means withdrawing gas from the falling popped kernels and recycling said withdrawn gas to said device, said kernels continuing after such withdrawal to fall to a deposit point, said device and air duct also having an open lower end through which unpopped kernels fall by gravity when said gas velocity is decreased.

2. Corn popping apparatus comprising a transparent housing, a popping device having a popping chamber and a discharge air duct opening vertically upward in said housing, means for blowing gas into said popping chamber and out through said duct, means for feeding raw popcorn kernels into said gas before it enters said popping chamber, the velocity of the gas being sufficient to convey the kernels into and to suspend them in said popping chamber, means for heating the suspended kernels in said chamber, the velocity of the gas through said duct being sufficient to convey popped kernels out its open end, said housing having a dome above said open end to deflect the gas and the popped kernels carried thereby outwardly from said upper end and downwardly past said duct, receiving means in the path of movement of the descending popped kernels, means for withdrawing gas from said descending popped kernels at a point above said receiving means and recycling the withdrawn gas to said chamber, said kernels continuing after such withdrawal to fall to said receiving means, and receiving means below the gas inlet to said chamber for unpopped kernels which fall by gravity when said gas velocity is decreased.

3. Corn popping apparatus comprising a transparent housing, a substantially tubular popping device disposed vertically within said housing and having an open upper end, means for blowing hot gas into the lower end of and upwardly through said device, means for feeding raw kernels into said device at a point near said lower end but above the point of introduction of said gas, said blowing means producing a gas velocity sufficient to suspend unpopped kernels in said device while carrying popped kernels out its open upper end, a collector at the bottom of said device for unpopped kernels, said housing having a dome above said open upper end to deflect the gas and the popped kernels carried thereby radially outwardly from said upper end and then downwardly around said device, and means for withdrawing gas from the falling popped kernels at a point above said collector and recycling said gas to the lower end of said device.

4. Apparatus as defined in claim 3, said housing comprising two substantially cylindrical concentric walls of transparent material enclosing between them a heat-insulating space.

5. Apparatus as defined in claim 3 including a supporting structure having a horizontal surface and an opening therein in which said device is mounted, said housing being mounted on said horizontal surface.

6. Apparatus as defined in claim 3 including a supporting structure having an opening in which said device is mounted, said housing being mounted on said structure and enclosing said device above said structure, said structure including a wall surrounding said device below said housing and guiding the falling popped kernels downwardly around said collector.

7. Apparatus as defined in claim 6, said wall forming an enclosure of substantially circular cross section and decreasing in diameter toward its bottom to funnel said falling popped kernels inwardly toward the center of the device.

8. Apparatus as defined in claim 3, including a funnel-shaped wall surrounding said device below said housing for guiding the falling popped kernels downwardly.

9. Apparatus as defined in claim 8 including a second funnel-shaped wall of less diameter than and located concentrically within said first funnel-shaped wall, said second wall being of less depth than said first wall and providing an annular space for lateral withdrawal of the hot gas, and a suction means connected to said space for withdrawing hot gases therefrom.

10. Apparatus as defined in claim 9, comprising a blower having its suction side connected to said space and its discharge side connected to the lower end of said device.

11. In corn popping apparatus of the type in which kernels to be popped are heated while suspended in a current of gas rising vertically through a substantially tubular popping chamber, a popping device comprising a plurality of end-to-end tubular sections of successively greater diameter in an upward direction, two successive sections comprising a lower transporting section for unpopped kernels and a next upper popping section, said lower section being of relatively small diameter to provide a gas current of high velocity therethrough for conveying unpopped kernels into said next upper section, and preventing descent of unpopped kernels therefrom, and the popping zone in said next upper section being established by the decrease in velocity of said current accompanying the increase in passage area between said lower section and said next upper section, said decreased velocity at the exit end of said popping zone being less than that required to convey the unpopped kernels further upward.

12. A device as defined in claim 11, said successive tubular sections being connected by tapered sections of approximately conical form.

13. A device as defined in claim 11, comprising a third tubular section above said popping section and of larger diameter than said popping section.

14. A device as defined in claim 11, comprising a third tubular section above said popping section and of smaller diameter than said popping section.

15. In corn popping apparatus of the type in which kernels to be popped are heated while suspended in a current of gas rising vertically through a substantially tubular popping chamber, a popping device comprising a plurality of end-to-end tubular sections of successively greater diameter in an upward direction, said current of air passing through a lower section of relatively small diameter to provide a current of high velocity and prevent descent of unpopped kernels therein, the beginning of the popping zone being defined by the decrease in velocity of said current due to the increase in passage area between said lower section and the next upper section, and the end of said popping zone being similarly defined by the further decrease in velocity of said current due to the further increase in passage area between said next upper section and the section above it.

16. Corn popping apparatus comprising a vertically disposed popping device formed of a plurality of substantially tubular end-to-end sections of successively greater diameter in an upward direction, means for blowing hot gas into a lower section of small diameter and upwardly through said device, means for feeding raw kernels into said device at a point near the junction of said lower section with the next upper section of larger diameter, said blowing means producing a gas velocity in said lower section sufficient to convey unpopped kernels into said next upper section which constitutes a popping zone in which said unpopped kernels are suspended, a collector at the bottom of said device for unpopped kernels, the upper end of said device being an open end through which popped kernels are conveyed by the gas current, and a dome above said open end to deflect the popped kernels carried by said current radially outward and then downwardly around said device.

17. Apparatus as defined in claim 13 comprising a transparent housing surrounding said device and having a domed top to deflect the popped kernels.

18. Apparatus as defined in claim 13, said blowing means having a suction connection to the interior of said housing whereby the hot gas is recirculated through the popping device.

References Cited in the file of this patent
UNITED STATES PATENTS

| | | |
|---|---|---|
| 1,104,990 | Harding | July 28, 1914 |
| 1,648,005 | Pritchard | Nov. 8, 1927 |
| 1,938,981 | Smith | Dec. 12, 1933 |
| 2,156,022 | McFaul | Apr. 25, 1939 |
| 2,421,902 | Neuschotz | June 10, 1947 |
| 2,602,134 | Nelson | July 1, 1952 |
| 2,606,489 | Morsette | Aug. 12, 1952 |
| 2,668,636 | Martin | Feb. 9, 1954 |
| 2,721,510 | Caswell | Oct. 25, 1955 |